US012619330B2

(12) United States Patent
Tsuyuki

(10) Patent No.: US 12,619,330 B2
(45) Date of Patent: May 5, 2026

(54) INFORMATION PROCESSING APPARATUS, CONTROL METHOD, AND NON-TRANSITORY COMPUTER READABLE MEDIUM FOR OPERATION INPUT USING A TOUCH SCREEN

(71) Applicant: Yokogawa Electric Corporation, Musashino (JP)

(72) Inventor: Mayu Tsuyuki, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/675,579

(22) Filed: May 28, 2024

(65) Prior Publication Data

US 2025/0004596 A1 Jan. 2, 2025

(30) Foreign Application Priority Data

Jun. 30, 2023 (JP) ................................. 2023-108036

(51) Int. Cl.
*G06F 3/041* (2006.01)
*G06F 3/04886* (2022.01)

(52) U.S. Cl.
CPC ........ *G06F 3/0418* (2013.01); *G06F 3/04886* (2013.01)

(58) Field of Classification Search
CPC .. G06F 3/0488; G06F 3/0418; G06F 3/04886; G06F 3/04883
See application file for complete search history.

(56) References Cited

U.S. PATENT DOCUMENTS

| | | | |
|---|---|---|---|
| 9,733,739 | B1 | 8/2017 | Yates et al. |
| 2006/0132457 | A1 | 6/2006 | Rimas-Ribikauskas et al. |
| 2008/0278455 | A1* | 11/2008 | Atkins ................. G06F 3/0488 |
| | | | 345/173 |
| 2016/0084875 | A1 | 3/2016 | Aoki |
| 2018/0181294 | A1 | 6/2018 | Dare et al. |

FOREIGN PATENT DOCUMENTS

| | | |
|---|---|---|
| JP | 2006-185443 A | 7/2006 |
| JP | 2014-075075 A | 4/2014 |
| JP | 2016-66866 A | 4/2016 |
| JP | 2023-061048 A | 5/2023 |

OTHER PUBLICATIONS

Office Action dated Feb. 17, 2026, issued in counterpart JP Application No. 2023-108036, with English translation. ( pages).

* cited by examiner

*Primary Examiner* — Yaron Cohen
(74) *Attorney, Agent, or Firm* — WHDA, LLP

(57) ABSTRACT

An information processing apparatus includes a touch screen and a controller. The controller is configured to detect a touch operation within a predetermined area corresponding to the position of an output operation object displayed on the touch screen, and execute a control command corresponding to the output operation object when a touch duration within the predetermined area is equal to or more than a predetermined time and a position from which a touch has left is within the predetermined area.

13 Claims, 8 Drawing Sheets

INFORMATION PROCESSING APPARATUS, CONTROL METHOD, AND NON-TRANSITORY COMPUTER READABLE MEDIUM FOR OPERATION INPUT USING A TOUCH SCREEN

CROSS-REFERENCE TO RELATED APPLICATION

This application claims priority to Japanese Patent Application No. 2023-108036, filed on Jun. 30, 2023, the entire contents of which are incorporated herein by reference.

TECHNICAL FIELD

The present disclosure relates to an information processing apparatus, a control method, and a non-transitory computer readable medium.

BACKGROUND

In conventional information processing apparatuses such as industrial measurement instruments, output operations, measurement operations, and the like are performed using hard keys. Using the hard keys allows users to intentionally operate the information processing apparatuses because the operations involve pressing the keys in. In addition, by lighting up buttons after the operations are completed, it is clearly indicated that output is in progress. In recent years, however, the information processing apparatuses have shifted to the use of touch screens to input operations. For example, Patent Literature (PTL) 1 discloses technology for operation input using a touch screen.

CITATION LIST

Patent Literature

PTL 1: JP 2016-066866 A

SUMMARY

An information processing apparatus according to an embodiment of the present disclosure is an information processing apparatus including:
a touch screen; and
a controller configured to:
    detect a touch operation within a predetermined area corresponding to the position of an output operation object displayed in the touch screen; and
    execute a control command corresponding to the output operation object when a touch duration within the predetermined area is equal to or more than a predetermined time and a position from which a touch has left is within the predetermined area.

BRIEF DESCRIPTION OF THE DRAWINGS

In the accompanying drawings.

DETAILED DESCRIPTION

Figure 1:
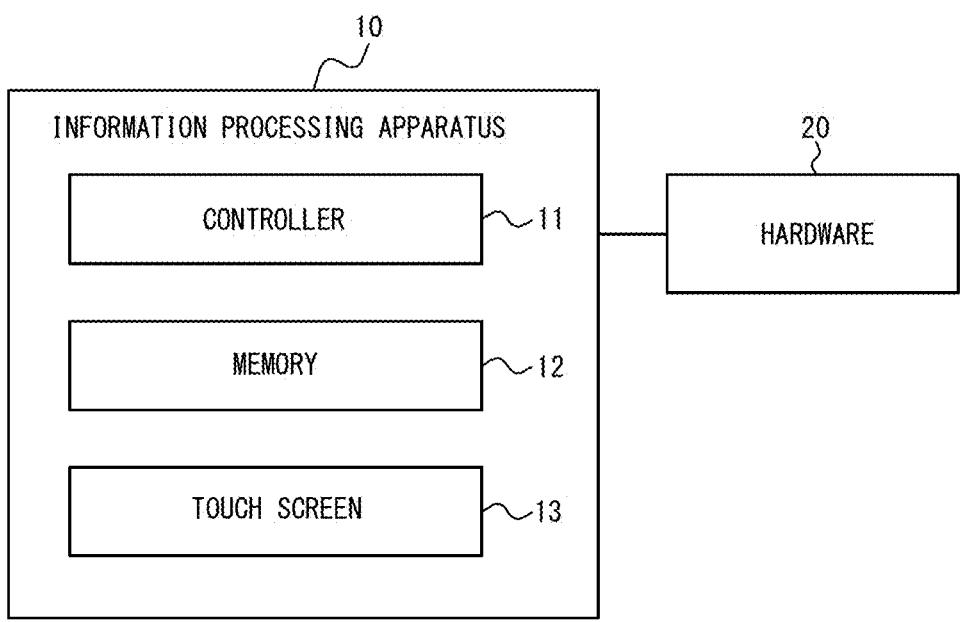
FIG. 1 is a block diagram illustrating a schematic configuration of an information processing apparatus according to an embodiment of the present disclosure.

As described above, for example, PTL 1 discloses technology for operation input using a touch screen. However, when a finger touches the touch screen unintentionally, or when noise occurs on the touch screen, there is a risk of an erroneous operation or the like. In other words, there is room for improvement in user interface technology for operation input on touch screens.

It would be helpful to improve user interface technology for operation input on touch screens.

(1) An information processing apparatus according to an embodiment of the present disclosure is an information processing apparatus including:
a touch screen; and
a controller configured to:
    detect a touch operation within a predetermined area corresponding to the position of an output operation object displayed on the touch screen; and
    execute a control command corresponding to the output operation object when a touch duration within the predetermined area is equal to or more than a predetermined time and a position from which a touch has left is within the predetermined area.

(2) An information processing apparatus according to an embodiment of the present disclosure is the information processing apparatus described in (1),
wherein the controller does not execute the control command corresponding to the output operation object when the touch duration on the touch screen is less than the predetermined time or the position from which the touch has left is outside the predetermined area.

(3) An information processing apparatus according to an embodiment of the present disclosure is the information processing apparatus described in (1) or (2),
wherein the controller is configured to display, on the touch screen, a gauge whose level varies in response to the touch duration.

(4) An information processing apparatus according to an embodiment of the present disclosure is the information processing apparatus described in (3), wherein the controller displays a maximized level of the gauge when the touch duration is equal to or more than the predetermined time.

(5) An information processing apparatus according to an embodiment of the present disclosure is the information processing apparatus described in (3) or (4), wherein the controller emphasizes display pertaining to the gauge when the touch duration is equal to or more than the predetermined time.

(6) An information processing apparatus according to an embodiment of the present disclosure is the information processing apparatus described in any one of (1) to (5), wherein upon detecting a swiping operation within the predetermined area, the controller shortens the predetermined time in response to the speed of the swiping operation.

(7) An information processing apparatus according to an embodiment of the present disclosure is the information processing apparatus described in any one of (1) to (5), wherein upon detecting a pushing operation within the predetermined area, the controller shortens the predetermined time in response to the pressure of the pushing operation.

(8) An information processing apparatus according to an embodiment of the present disclosure is the information processing apparatus described in any one of (1) to (7), wherein the predetermined time is set based on a dangerous degree of the control command.

(9) A method according to an embodiment of the present disclosure is a method performed by an information processing apparatus including a touch screen, the method including:

detecting a touch operation within a predetermined area corresponding to the position of an output operation object displayed on the touch screen; and executing a control command corresponding to the output operation object when a touch duration on the touch screen is equal to or more than a predetermined time and a position from which a touch has left is within the predetermined area.

(10) A program according to an embodiment of the present disclosure is configured to cause a computer, which functions as an information processing apparatus including a touch screen, to execute operations, the operations including:

detecting a touch operation within a predetermined area corresponding to the position of an output operation object displayed on the touch screen; and executing a control command corresponding to the output operation object when a touch duration on the touch screen is equal to or more than a predetermined time and a position from which a touch has left is within the predetermined area.

According to an embodiment of the present disclosure, it is possible to improve user interface technology for operation input on touch screens.

An information processing apparatus 10 according to an embodiment of the present disclosure will be described below with reference to the drawings.

In the drawings, identical or equivalent portions are denoted by the same reference numerals. In the description of this embodiment, explanations of the identical or equivalent portions are omitted or simplified as appropriate.

With reference to FIG. 1, an overview and configuration of the information processing apparatus 10 according to this embodiment will be described.

The information processing apparatus 10 is any information processing apparatus used by a user. For example, the information processing apparatus 10 includes industrial measurement instruments, control apparatuses, general purpose electronic equipment, dedicated electronic equipment, or the like. The information processing apparatus 10 issues, to hardware 20, an output control command such as laser output or power output, for example, based on a user operation. The hardware 20 is, for example, a light source or the like, and is equipment that performs laser output, power output, or the like.

An overview of this embodiment will be described first, and the details thereof will be described below. The information processing apparatus 10 detects a touch operation within a predetermined area corresponding to the position of an output operation object displayed on a touch screen. The information processing apparatus 10 executes a control command corresponding to the output operation object when a touch duration in the predetermined area is equal to or more than a predetermined time and a position from which a touch has left is within the predetermined area. The output operation object is, for example, a button or the like to execute the control command, and is displayed on the touch screen. Note that, the output operation object does not include objects, such as ordinary icons, that are not related to the execution of the control command.

Thus, according to this embodiment, the information processing apparatus 10 performs determinations pertaining to the touch duration within the predetermined area and the position from which the touch has left, and executes the control command when these conditions are met. Therefore, according to this embodiment, the information processing apparatus 10 can improve user interface technology for operation input on touch screens in that the information processing apparatus 10 can prevent an erroneous operation pertaining to the control command. In particular, in the cases of operations that involve danger, such as optical output or electrical output, the user's intention can be more reliably confirmed because the user is required to press and hold the output operation object and release his/her finger after a predetermined period of time has elapsed.

Next, each configuration of the information processing apparatus 10 will be described in detail.

(Configuration of Information Processing Apparatus 10)

As illustrated in FIG. 1, the information processing apparatus 10 is provided with a controller 11, a memory 12, and a touch screen 13.

The controller 11 includes at least one processor, at least one dedicated circuit, or a combination of these. The processor is a general purpose processor such as a central processing unit (CPU) or graphics processing unit (GPU), or a dedicated processor specialized for particular processing. The dedicated circuit is, for example, a field-programmable gate array (FPGA) or an application specific integrated circuit (ASIC). The controller 11 executes processing related to operations of the information processing apparatus 10 while controlling each part of the information processing apparatus 10.

The memory 12 includes at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 12 functions as, for example, a main memory, an auxiliary memory, or a cache memory. The memory 12 stores data to be used in the operations of the information processing apparatus 10 and data obtained by the operations of the information processing apparatus 10.

The touch screen 13 is an input/output section provided integrally with a display. The display may be, for example, a liquid crystal display (LCD) or an organic electro luminescence (EL) display. The touch screen 13 accepts operations to input data to be used in the operations of the information processing apparatus 10. The touch screen 13 also displays and outputs data obtained by the operations of the information processing apparatus 10. The touch screen 13 may be connected to the information processing apparatus 10 as an external input device, instead of being provided in the information processing apparatus 10. As a connection method, for example, any connection method such as universal serial bus (USB), high-definition multimedia interface (HDMI®) (HDMI is a registered trademark in Japan, other countries, or both), or Bluetooth® (Bluetooth is a registered trademark in Japan, other countries, or both) may be used.

The functions of the information processing apparatus 10 are realized by executing a program according to this embodiment by a processor corresponding to the information processing apparatus 10. In other words, the functions of the information processing apparatus 10 are realized by software. The program causes a computer to function as the information processing apparatus 10 by causing the computer to execute the operations of the information processing apparatus 10. In other words, the computer functions as the information processing apparatus 10 by executing the operations of the information processing apparatus 10 according to the program.

In this embodiment, the program can be recorded in a computer readable recording medium. The computer readable recording medium includes a non-transitory computer readable medium, and is, for example, a magnetic recording device, an optical disk, a magneto-optical recording medium, or a semiconductor memory. The program is distributed, for example, by selling, transferring, or lending a portable recording medium such as a digital versatile disc (DVD) or compact disc read only memory (CD-ROM) in which the program is recorded. The program may also be distributed by storing the program in storage on an external server and transmitting the program from the external server to other computers. The program may also be provided as a program product.

(Operations of Information Processing Apparatus)

Figure 2:
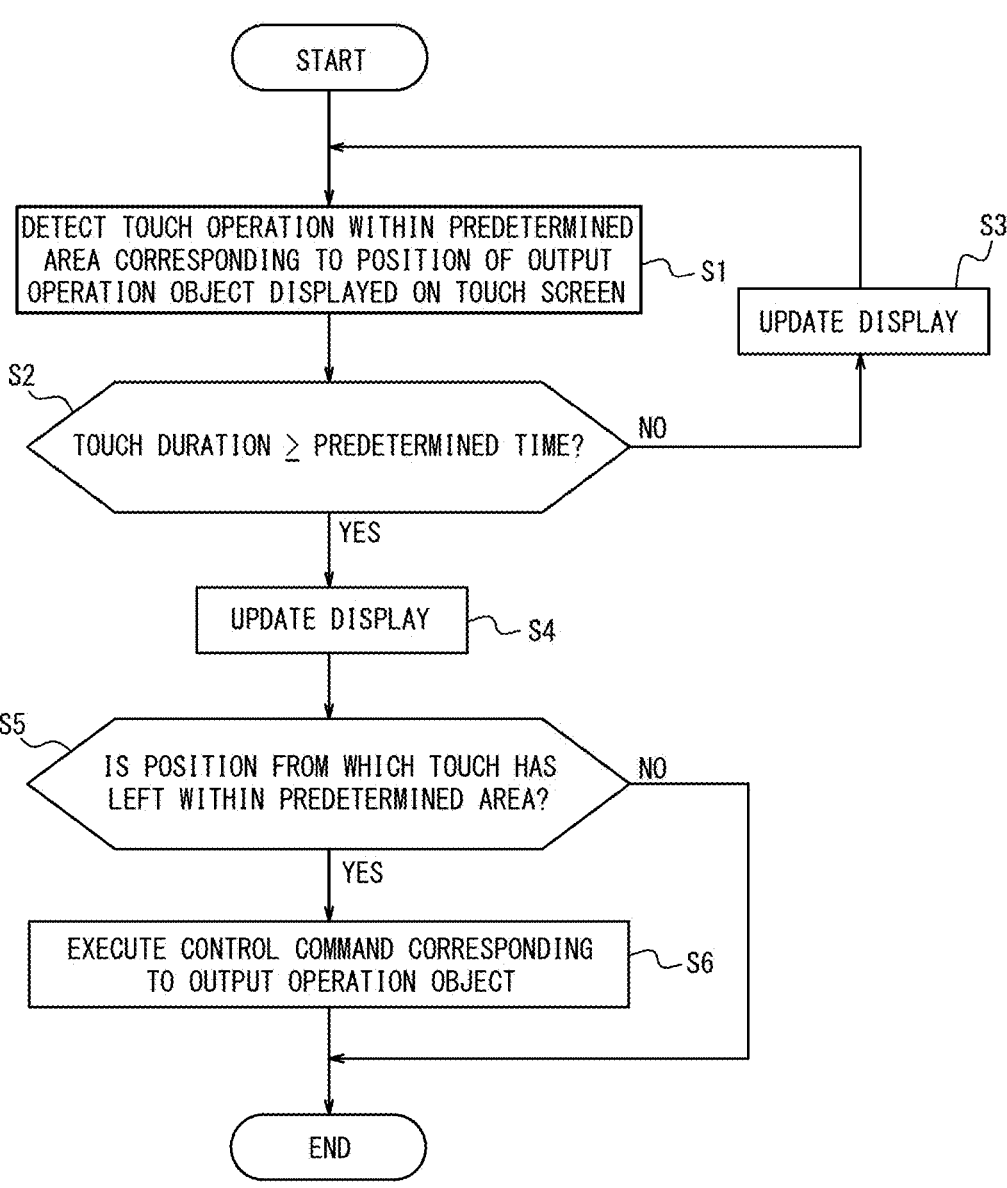
FIG. 2 is a flowchart illustrating operations of the information processing apparatus according to an embodiment of the present disclosure.

With reference to FIG. 2, the operations of the information processing apparatus 10 according to this embodiment will be described. FIG. 2 is a flowchart illustrating an example of a method executed by the information processing apparatus 10 according to this embodiment.

Step S1: The controller 11 of the information processing apparatus 10 detects a touch operation within the predetermined area corresponding to the position of the output operation object displayed on the touch screen 13. In other words, the controller 11 detects at which position on the touch screen 13 the touch operation by the user is performed.

The predetermined area may be, for example, an area that coincides with a display area of the output operation object. Alternatively, the predetermined area may be different from the display area of the output operation object. For example, when the user cannot see the touch screen 13 from the front, the predetermined area may be changed according to the user's viewing position. For example, when the user's viewing position of the touch screen 13 is above the front of the touch screen 13, the predetermined area may be a position to which the display area of the output operation object is shifted upward in parallel by a predetermined distance.

Step S2: The controller 11 determines whether a duration of the touch operation (hereinafter also referred to as "touch duration") within the predetermined area is equal to or more than a predetermined time. The predetermined time is, for example, one second, but is not limited to this. The predetermined time may be longer than one second or shorter than one second. When the touch duration within the predetermined area is less than the predetermined time, the process proceeds to step S3. On the other hand, when the touch duration within the predetermined area is equal to or more than the predetermined time, the process proceeds to step S4.

Note that, when the position on the touch screen 13 at which a touch has continued shifts outside the predetermined area, various responses may be performed. For example, when the position at which the touch has continued shifts outside the predetermined area, the process may end. In this case, an operation of the control command is aborted. Similarly, the process may end when the touch has left. In this case, the operation of the control command is aborted. In the following description, the operation of the control command is aborted when the touch within the predetermined area has not continued, but is not limited to this. For example, when the position at which the touch has continued shifts outside the predetermined area, the progression of the touch duration within the predetermined area may be suspended. In this case, when the touch position returns to within the predetermined area, the progression of the touch duration within the predetermined area may be resumed.

Step S3: The controller 11 updates the display of a gauge based on the touch duration within the predetermined area and displays the gauge on the touch screen 13. The gauge is a display object whose level varies in response to the touch duration within the predetermined area. When the touch duration within the predetermined area is less than the predetermined time, the processes of step S2 and step S3 are repeated, and the display of the gauge is updated by the minute to indicate the level corresponding to the touch duration within the predetermined area. Examples of the display of the gauge will be described below.

Step S4: The controller 11 displays a maximized level of the gauge on the touch screen 13. Such display can inform the user that the touch duration within the predetermined area has become equal to or more than the predetermined time. At this time, the controller 11 may also emphasize the display pertaining to the gauge. Any method can be adopted to emphasize the display. For example, the thickness of a frame border of the gauge may be increased. Alternatively, the gauge may be displayed in an inverted manner.

Step S5: The controller 11 determines whether a position from which the touch has left is within the predetermined area. When the position from which the touch has left is within the predetermined area, the process proceeds to step S6. On the other hand, when the position from which the touch has left is not within the predetermined area, the process ends. In other words, in this case, the operation of the control command is aborted.

Step S6: The controller 11 executes the control command corresponding to the output operation object. The controller 11 thereby issues the control command to the hardware 20, such as a light source.

Figure 3:
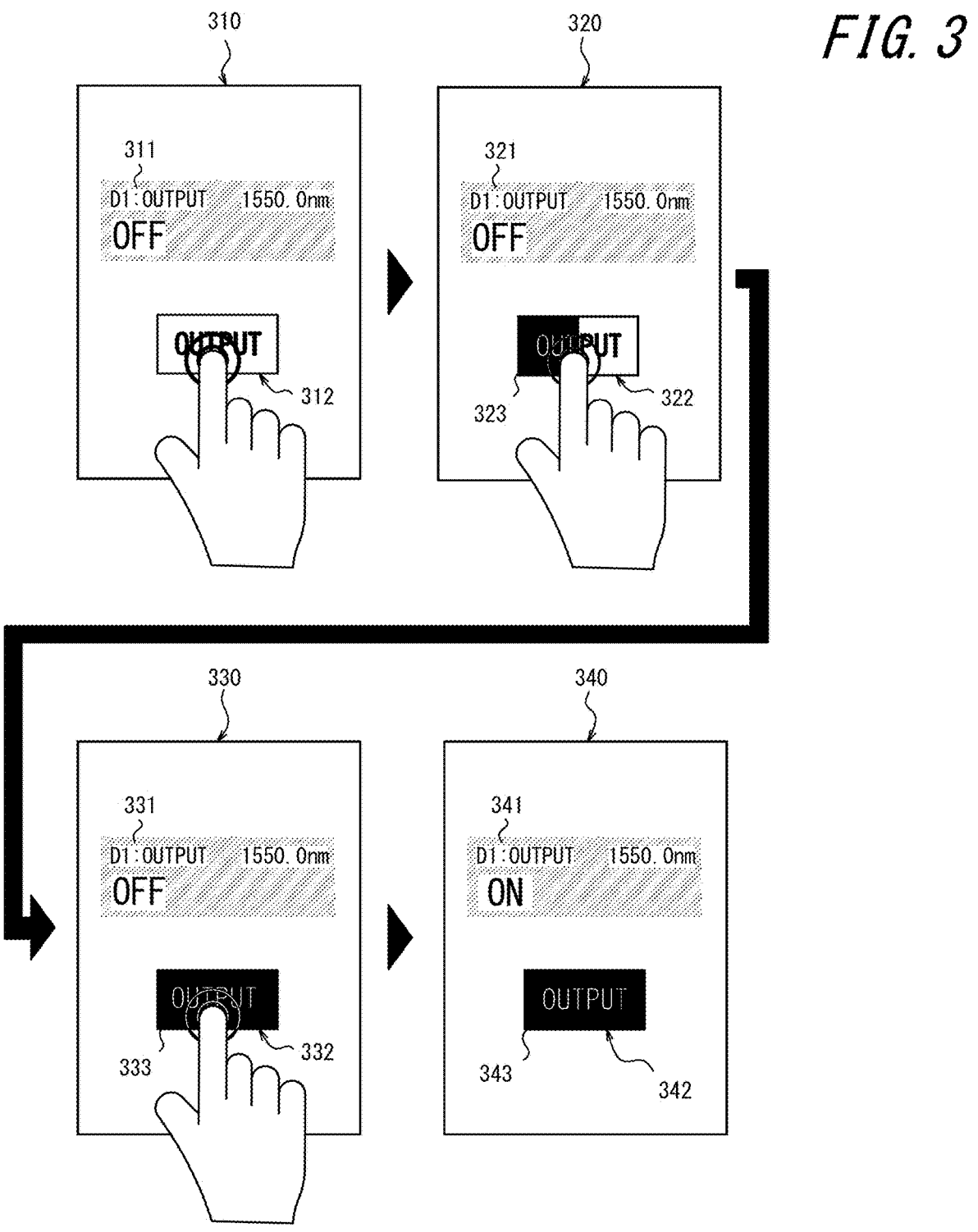
FIG. 3 is a diagram illustrating an example of screen transition displayed in accordance with the operations of the information processing apparatus according to the embodiment.

FIG. 3 illustrates an example of screen transition displayed on the touch screen 13 in accordance with the operations of the information processing apparatus 10 according to this embodiment. Here, a screen transition diagram in an operation from a start to a completion of an output operation pertaining to the control command to output a laser from the light source is illustrated.

A screen 310 is an example of a display screen at the start of the operation. With the operation by the user, the screen 310 transitions in the order of a screen 320, a screen 330, and a screen 340. The screen 310 includes a command information display object 311 and an output operation object 312. The command information display object 311 indicates information regarding the light source to which the control command is to be output. The command information display object 311 also indicates an output state (in this case, OFF) of the light source. The output operation object 312 is an object, such as a button, that accepts the touch operation by the user. Upon detecting a start operation by the user pressing and holding the output operation object 312 in the predetermined area, the controller 11 of the information processing apparatus 10 starts the processes, and the screen 310 transitions to the screen 320.

The screen 320 is an example of a display screen when the touch duration within the predetermined area is less than the predetermined time. The screen 320 includes a command information display object 321, an output operation object 322, and a gauge 323. The command information display object 321 indicates information regarding the light source to which the control command is to be output. The command information display object 321 also indicates an output state (in this case, OFF) of the light source. On the screen 320, the gauge 323 is displayed in a superimposed manner on the output operation object 322. The gauge 323 varies its level in response to the touch duration within the predetermined area. In this embodiment, the gauge 323 is represented by a rectangular object that extends in response to the level from a left end to a right end of the output operation object 322. Thus, when the output operation object 322 is pressed and held, the gauge 323 in the output operation object 322 increases with a lapse of time.

The screen 330 is an example of a display screen when the touch duration within the predetermined area is equal to or more than the predetermined time. The screen 330 includes a command information display object 331, an output operation object 332, and a gauge 333. The command information display object 331 indicates information regarding the light source to which the control command is to be output. The command information display object 331 also indicates an output state (in this case, OFF) of the light source. On the screen 330, the gauge 333 is displayed in a superimposed manner on the output operation object 332. In the screen 330, the level of the gauge 333 is a maximum value because the touch duration within the predetermined area is equal to or more than the predetermined time. In other words, the gauge 333 is full on the screen 330.

The screen 340 is an example of a display screen when the touch duration within the predetermined area is equal to or more than the predetermined time and the position from which the touch has left is within the predetermined area. The screen 340 includes a command information display object 341, an output operation object 342, and a gauge 343. The command information display object 341 indicates information regarding the light source to which the control command is to be output. The command information display object 341 also indicates an output state (in this case, ON) of the light source. Here, since the touch duration is equal to or more than the predetermined time and the position from which the touch has left is within the predetermined area, the control command corresponding to the output operation object 342 is executed and the output state of the light source is switched from OFF to ON.

Figure 4:
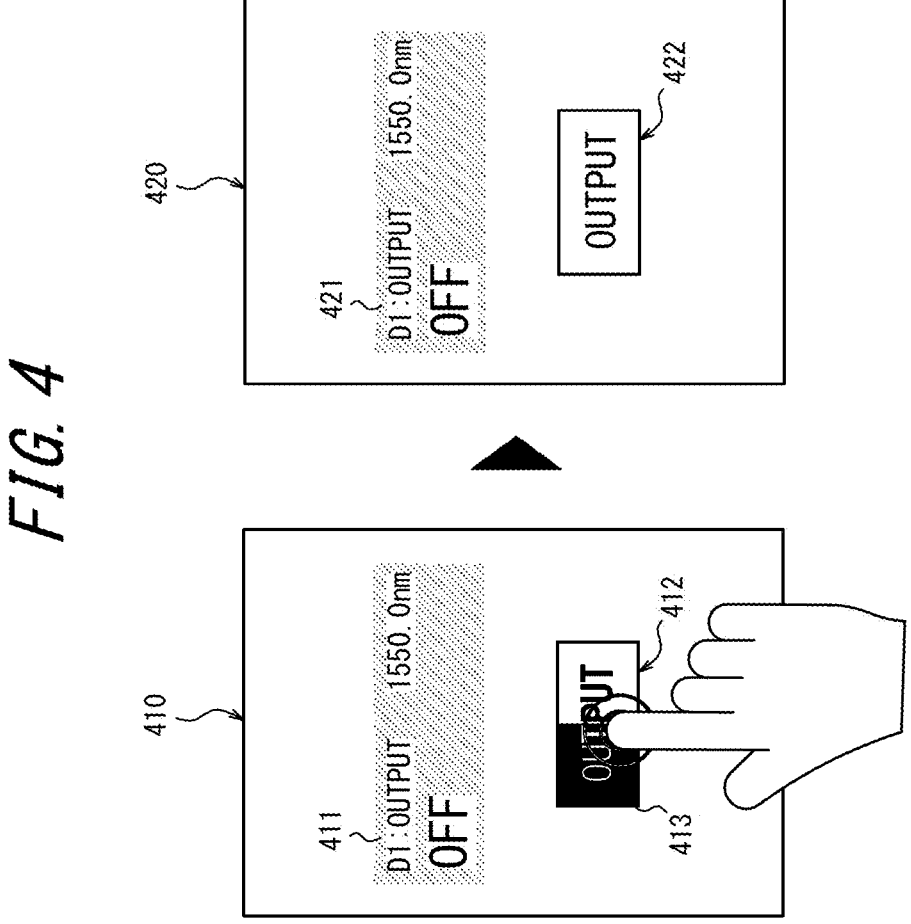
FIG. 4 is a diagram illustrating an example of screen transition displayed in accordance with the operations of the information processing apparatus according to the embodiment.

FIG. 4 illustrates another example of screen transition displayed on the touch screen 13 in accordance with the operations of the information processing apparatus 10 according to this embodiment. Here, the screen transition in an operation of aborting the command, after the start of the output operation pertaining to the control command to output the laser from the light source, is illustrated.

A screen 410 is an example of a display screen when the touch duration within the predetermined area is less than the predetermined time. The screen 410 includes a command information display object 411, an output operation object 412, and a gauge 413. The command information display object 411 indicates information regarding the light source to which the control command is to be output. The command information display object 411 also indicates an output state (in this case, OFF) of the light source.

A screen 420 is an example of a display screen when the touch duration within the predetermined area is less than the predetermined time and after the touch has left. The screen 420 includes a command information display object 421 and an output operation object 422. The command information display object 421 indicates information regarding the light source to which the control command is to be output. The command information display object 421 also indicates an output state (in this case, OFF) of the light source. On the screen 420, the accumulated gauge has disappeared because the touch has left. Thus, before the gauge becomes full (when the touch duration is less than the predetermined time), the output operation can be aborted by releasing the finger from the output operation object 422.

Figure 5:
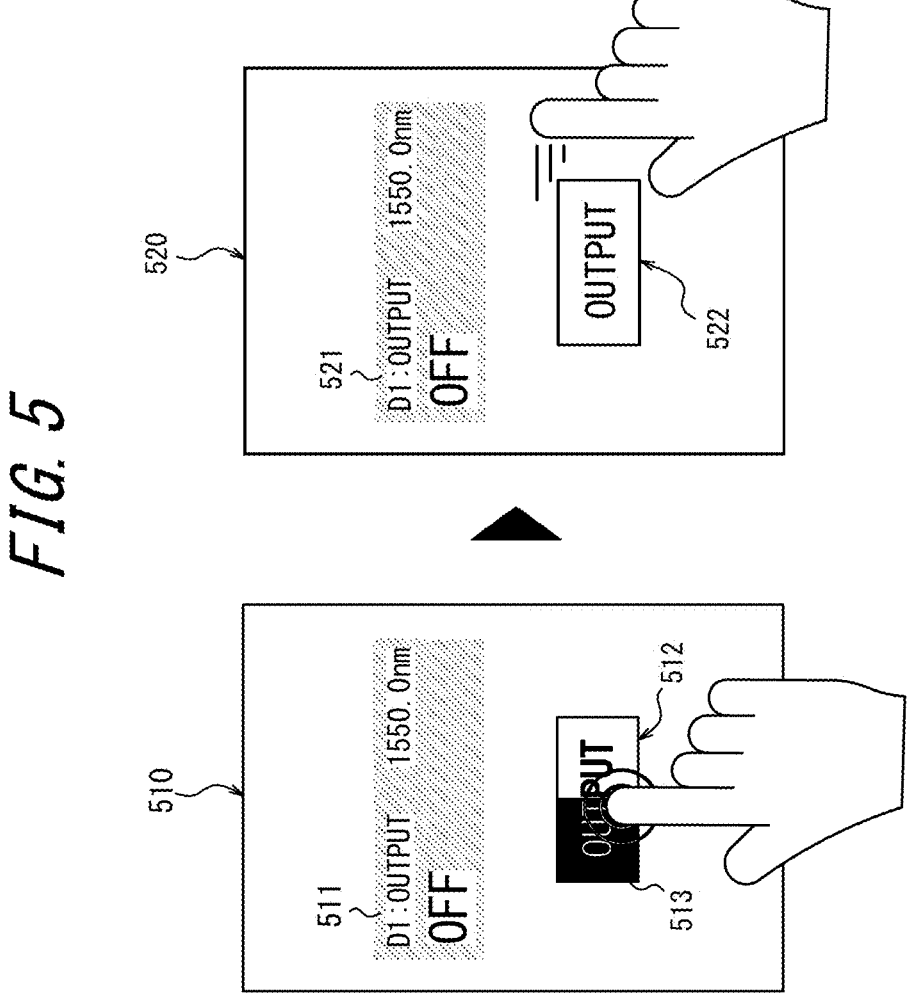
FIG. 5 is a diagram illustrating an example of screen transition displayed in accordance with the operations of the information processing apparatus according to the embodiment.

FIG. 5 illustrates another example of screen transition displayed on the touch screen 13 in accordance with the operations of the information processing apparatus 10 according to this embodiment. Here, another example of the screen transition in an operation of aborting the command, after the start of the output operation pertaining to the control command to output the laser from the light source, is illustrated.

A screen 510 is an example of a display screen when the touch duration within the predetermined area is less than the predetermined time. The screen 510 includes a command information display object 511, an output operation object 512, and a gauge 513. The command information display object 511 indicates information regarding the light source to which the control command is to be output. The command information display object 511 also indicates an output state (in this case, OFF) of the light source.

A screen 520 is an example of a display screen when the touch duration within the predetermined area is less than the predetermined time and after the touch has shifted outside the predetermined area. The screen 520 includes a command information display object 521 and an output operation object 522. The command information display object 521 indicates information regarding the light source to which the control command is to be output. The command information display object 521 also indicates an output state (in this case, OFF) of the light source. On the screen 520, the accumulated gauge has disappeared because the touch has shifted outside the predetermined area. Thus, before the gauge becomes full (when the touch duration is less than the predetermined time), the output operation can be aborted by sliding the finger from the output operation object 522 to the outside of the predetermined area.

Figure 6:
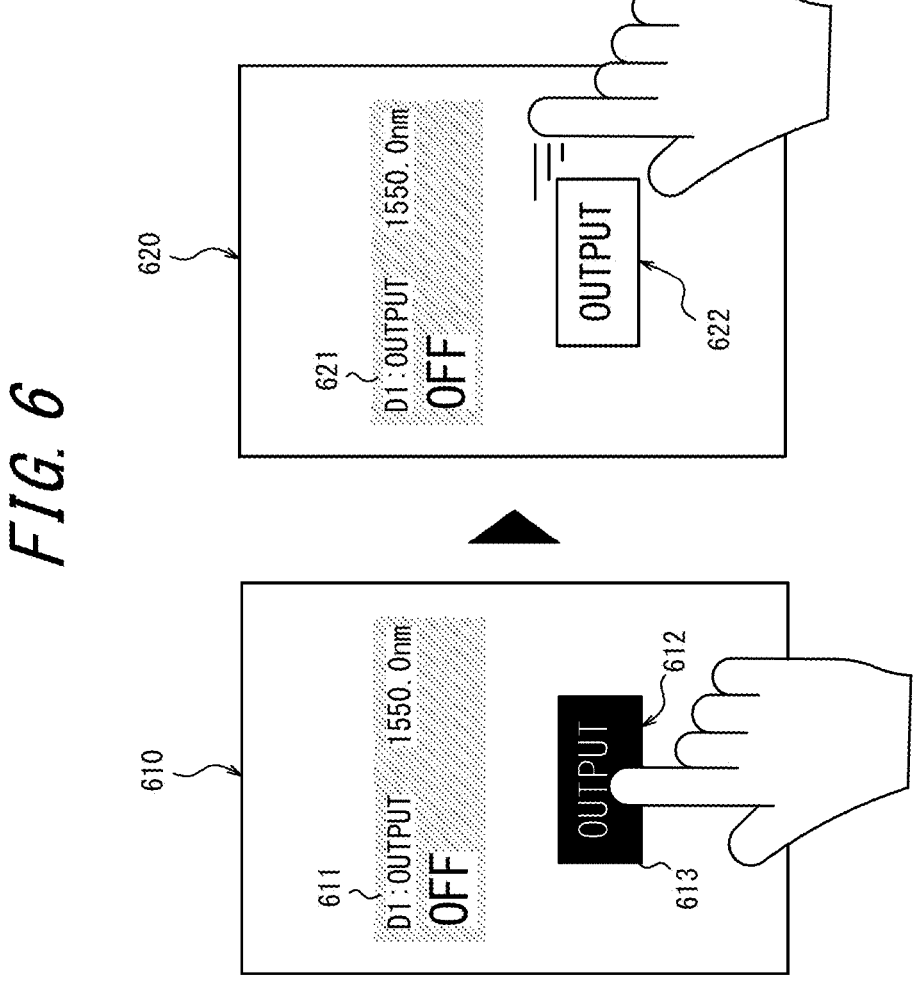
FIG. 6 is a diagram illustrating an example of screen transition displayed in accordance with the operations of the information processing apparatus according to the embodiment.

FIG. 6 illustrates another example of screen transition displayed on the touch screen 13 in accordance with the operations of the information processing apparatus 10 according to this embodiment. Here, yet another example of the screen transition in an operation of aborting the command, after the start of the output operation pertaining to the control command to output the laser from the light source, is illustrated.

A screen 610 is an example of a display screen when the touch duration within the predetermined area is equal to or more than the predetermined time. The screen 610 includes a command information display object 611, an output operation object 612, and a gauge 613. The command information display object 611 indicates information regarding the light source to which the control command is to be output. The command information display object 611 also indicates an output state (in this case, OFF) of the light source. On the screen 610, the gauge 613 is displayed in a superimposed manner on the output operation object 612. In the screen 610, the level of the gauge 613 is a maximum value because the touch duration within the predetermined area is equal to or more than the predetermined time.

A screen 620 is an example of a display screen when the touch duration within the predetermined area is equal to or more than the predetermined time and the position from which the touch has left is not within the predetermined area. The screen 620 includes a command information display object 621 and an output operation object 622. The command information display object 621 indicates information regarding the light source to which the control command is to be output. The command information display object 621 also indicates an output state (in this case, OFF) of the light source. On the screen 620, the accumulated gauge has disappeared because the position from which the touch has left is outside the predetermined area. Thus, even after the gauge becomes full (even when the touch duration is equal to or more than the predetermined time), the output operation can be aborted by sliding the finger from the output operation object 622 to the outside of the predetermined area and releasing the finger.

As described above, according to this embodiment, the controller 11 determines, in step S2, whether the touch duration within the predetermined area is equal to or more than the predetermined time. The controller 11 also determines, in step S5, whether the position from which the touch has left is within the predetermined area. As a result of these determinations, the controller 11 executes the control command corresponding to the output operation object when the touch duration is equal to or more than the predetermined time and the position from which the touch has left is within the predetermined area. In other words, the controller 11 executes the control command corresponding to the output operation object when the touch duration within the predetermined area is equal to or more than the predetermined time and the position from which the touch has left is within the predetermined area. Therefore, according to this embodiment, user interface technology for operation input on touch screens can be improved in that an erroneous operation pertaining to the control command can be prevented by requiring the user to perform the explicit operation.

Although the present disclosure has been described based on the drawings and examples, it should be noted that one skilled in the art can easily make various variations and modifications based on the present disclosure. Therefore, it should be noted that these variations and modifications are included in the scope of the present disclosure. For example, the functions and the like included in each means, step, or the like can be rearranged so as not to be logically inconsistent, and a plurality of means, steps, or the like can be combined into one or divided.

Figure 7:
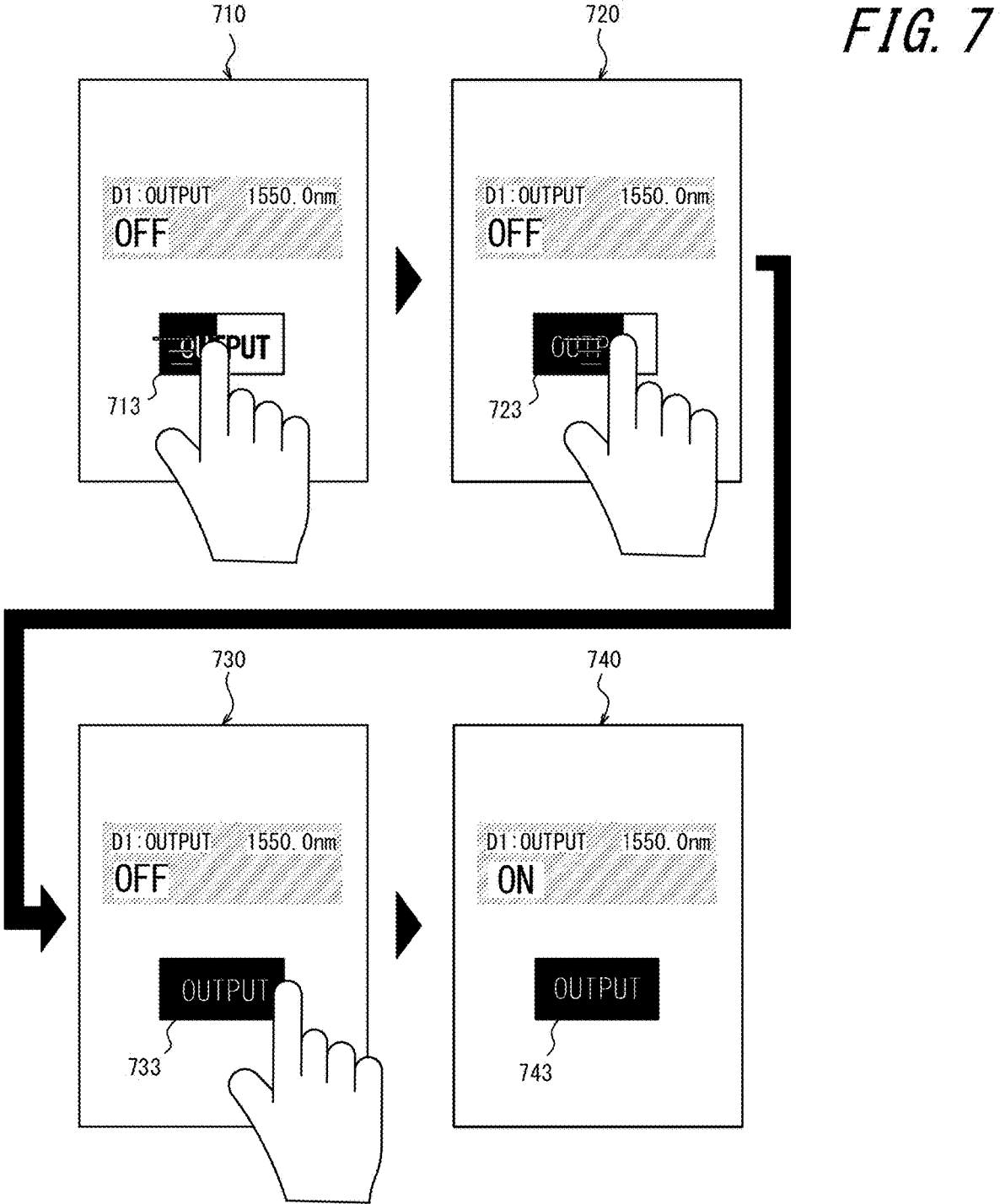
FIG. 7 is a diagram illustrating an example of screen transition displayed in accordance with the operations of the information processing apparatus according to the embodiment.

For example, according to this embodiment, the controller 11 determines whether the touch duration within the predetermined area is equal to or more than the predetermined time, but such predetermined time may be variable. For example, upon detecting a swiping operation within the predetermined area, the controller 11 may shorten the predetermined time in response to the speed of the swiping operation. In other words, the controller 11 may execute the control command corresponding to the output operation object by shortening the predetermined time based on the swiping operation, in addition to the pressing and holding operation. FIG. 7 illustrates an example of screen transition when the swiping operation is performed. A screen 710 is an example of a display screen when the swiping operation is started. A screen 720 is an example of a display screen during the swiping operation. A screen 730 is an example of a display screen when the swiping operation is completed. As illustrated in FIG. 7, in each of the screens 710, 720, and 730, a gauge increases by following the finger of the swiping operation. Thus, the predetermined time is shortened by adjusting the speed of increasing the level of the gauge with the swiping operation. A screen 740 is an example of a display screen when a position from which the touch has left is within the predetermined area. Since the position from which the touch has left is within the predetermined area, the output state of the light source is switched from OFF to ON by executing the control command corresponding to the output operation object.

Figure 8:
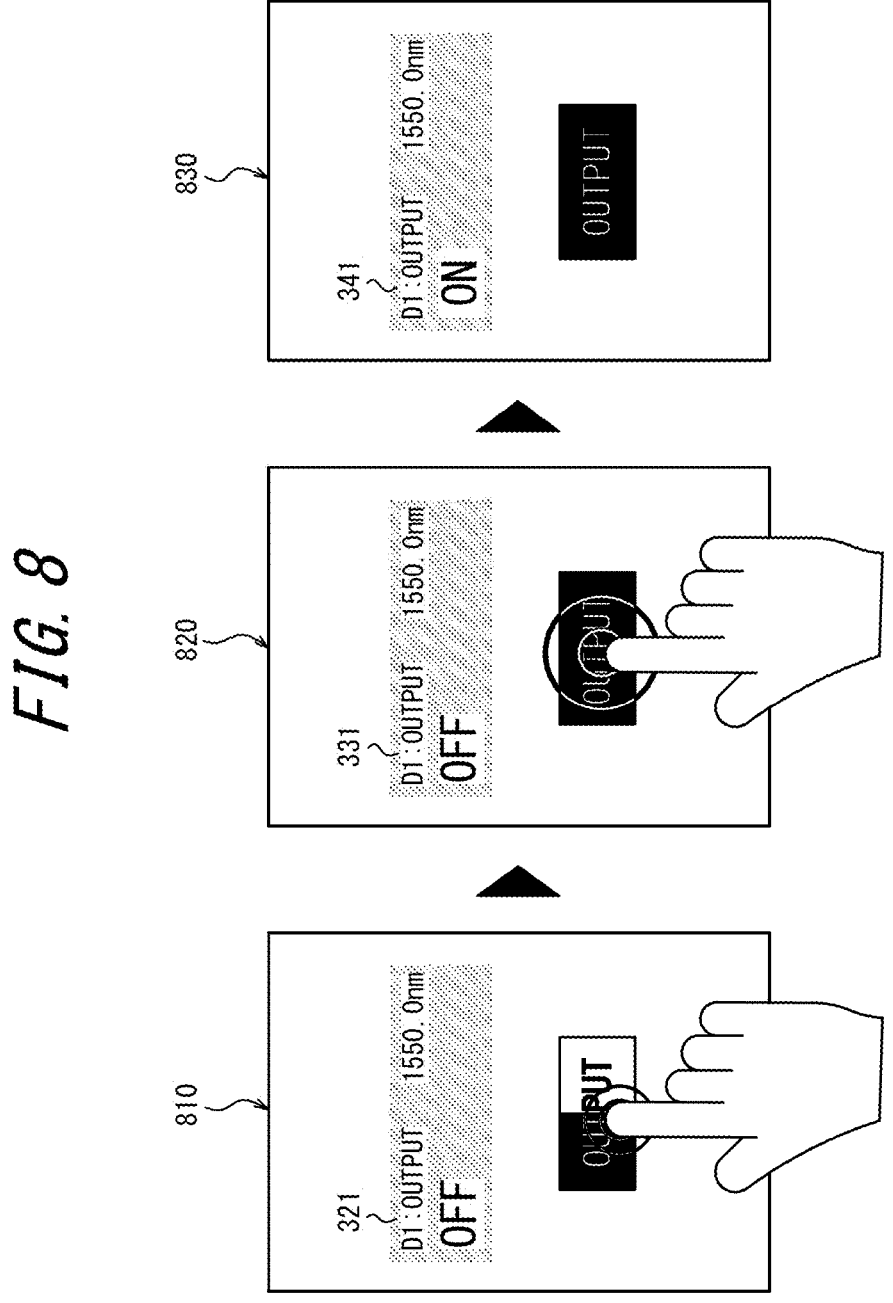
FIG. 8 is a diagram illustrating an example of screen transition displayed in accordance with the operations of the information processing apparatus according to the embodiment.

For example, upon detecting a pushing operation within the predetermined area, the controller 11 may shorten the predetermined time in response to the pressure of the pushing operation. In other words, the controller 11 may execute the control command corresponding to the output operation object by shortening the predetermined time based on the pushing operation, in addition to the pressing and holding operation. FIG. 8 illustrates an example of screen transition when the pushing operation is performed. A screen 810 is an example of a display screen when the pushing operation is started. A screen 820 is an example of a display screen when the pushing operation is completed. As illustrated in FIG. 8, in each of the screens 810 and 820, a gauge increases by following the pressure of the pushing operation. Thus, the predetermined time is shortened by adjusting the speed of increasing the level of the gauge with the pushing operation. A screen 830 is an example of a display screen when a position from which the touch has left is within the predetermined area. Since the position from which the touch has left is within the predetermined area, the output state of the light source is switched from OFF to ON by executing the control command corresponding to the output operation object.

For example, the predetermined time may be set based on a dangerous degree of the control command. In other words, a numerical value may be assigned to the control command in advance according to its dangerous degree. Here, the dangerous degree is an indicator of the degree of danger. The danger includes danger to human bodies, such as the risk of burns, and danger to equipment, such as equipment failure. For example, when the dangerous degree of a certain control command is equal to or more than a predetermined threshold, the predetermined time may be increased. On the other hand, when the dangerous degree of a certain control command is less than a predetermined threshold, the predetermined time may be decreased. Thus, for example, when each of output operation objects corresponding to multiple control commands is displayed on the touch screen, the predetermined time corresponding to each output operation object may be different.

For example, according to this embodiment, the controller 11 determines whether the touch duration within the predetermined area is equal to or more than the predetermined time, but may also determine whether the touch duration within the predetermined area is less than a second predetermined time. In other words, the controller 11 may determine, in step S2 above, whether the touch duration within the predetermined area is equal to or more than the predetermined time and less than the second predetermined time. When the touch duration is equal to or more than the second predetermined time, the operation of the control command may be aborted. The operation of the control command may be thereby aborted when the touch duration is too long.

In this embodiment, the output operation object is, for example, the button or the like to execute the control command, and the information processing apparatus 10 issues the output control command to the hardware 20 but is not limited to this. A target of operation by the output operation object may be any other object, and the information processing apparatus 10 does not have to issue the output control command to the hardware 20. The target of operation by the output operation object may include, for example, a process for which security is required. Specifically, the target of operation may include, for example, a payment process, a data manipulation (deletion, overwriting, movement), migration to other services such as external services, and the like. In such cases, according to this embodiment, the user's explicit operation is required, thereby preventing an erroneous operation in these targets of processes.

The invention claimed is:

1. An information processing apparatus comprising:
   a touch screen; and
   a controller configured to:
      detect a touch operation within a display area of an output operation object displayed on the touch screen; and
      execute a control command corresponding to the output operation object when a position of a touch is kept only within the display area of the output operation object for equal to or more than a predetermined time,
   wherein the controller is configured to display, in a superimposed manner on the output operation object displayed on the touch screen, a gauge whose level dynamically varies in response to a touch duration of the touch while the touch operation is being performed.

2. The information processing apparatus according to claim 1, wherein the controller does not execute the control command corresponding to the output operation object when the touch duration of the touch kept within the display area of the output operation object is less than the predetermined time or the position from which the touch has left is outside the display area of the output operation object.

3. The information processing apparatus according to claim 1, wherein the controller displays a maximized level of the gauge when the touch duration is equal to or more than the predetermined time.

4. The information processing apparatus according to claim 1, wherein the controller emphasizes display pertaining to the gauge when the touch duration is equal to or more than the predetermined time.

5. The information processing apparatus according to claim 1, wherein upon detecting a swiping operation within the display area of the output operation object, the controller dynamically shortens the predetermined time in response to a speed of the swiping operation while the swiping operation is being performed.

6. The information processing apparatus according to claim 1, wherein upon detecting a pushing operation within the display area of the output operation object, the controller dynamically shortens the predetermined time in response to a pressure of the pushing operation while the pushing operation is being performed.

7. The information processing apparatus according to claim 1, wherein the predetermined time is set based on a dangerous degree of the control command.

8. The information processing apparatus according to claim 1, wherein the controller is configured not to execute the control command when the position of the touch shifts outside the display area of the output operation object.

9. The information processing apparatus according to claim 1, wherein the controller is configured to have the display of the gauge disappeared when the position of the touch is kept within the display area of the output operation object for less than the predetermined time, and the touch is released from the touch screen.

10. The information processing apparatus according to claim 1, wherein the controller is configured to have the display of the gauge disappeared when the position of the touch shifts outside the display area of the output operation object, before the position of the touch is kept within the display area of the output operation object for equal to or more than the predetermined time.

11. The information processing apparatus according to claim 1, wherein the controller is configured to have the display of the gauge disappeared when the position of the touch shifts outside the display area of the output operation object, and the touch is released from the touch screen, after the position of the touch is kept within the display area of the output operation object for equal to or more than the predetermined time.

12. A method performed by an information processing apparatus including a touch screen, the method comprising:
   detecting a touch operation within a display area of an output operation object displayed on the touch screen;
   executing a control command corresponding to the output operation object when a position of a touch is kept only within the display area of the output operation object for equal to or more than a predetermined time; and
   displaying, in a superimposed manner on the output operation object displayed on the touch screen, a gauge whose level dynamically varies in response to a touch duration of the touch while the touch operation is being performed.

13. A non-transitory computer readable medium storing a program configured to cause a computer to execute operations, the computer functioning as an information processing apparatus including a touch screen, the operations comprising:
   detecting a touch operation within a display area of an output operation object displayed on the touch screen;
   executing a control command corresponding to the output operation object when a position of a touch is kept only within the display area of the output operation object for equal to or more than a predetermined time; and displaying, in a superimposed manner on the output operation object displayed on the touch screen, a gauge whose level dynamically varies in response to a touch duration of the touch while the touch operation is being performed.

\* \* \* \* \*